United States Patent [19]

Zones et al.

[11] Patent Number: 5,187,132
[45] Date of Patent: Feb. 16, 1993

[54] PREPARATION OF BOROSILICATE ZEOLITES

[75] Inventors: Stacey I. Zones; Lun T. Yuen, both of San Francisco; Susan D. Toto, South San Francisco, all of Calif.

[73] Assignee: Chevron Research and Technology Company, San Francisco, Calif.

[21] Appl. No.: 699,870

[22] Filed: May 14, 1991

[51] Int. Cl.$^5$ .................. B01J 29/04; C01B 35/10
[52] U.S. Cl. ................................ 502/64; 502/67; 502/70; 502/202; 423/277; 423/279; 423/705; 423/711; 423/333
[58] Field of Search .............. 502/64, 67, 70, 202; 423/279, 328, 329, 333

[56] References Cited

U.S. PATENT DOCUMENTS

| | | | |
|---|---|---|---|
| 4,235,753 | 11/1980 | Brown et al. | 423/328 |
| 4,343,723 | 8/1982 | Rogers et al. | 423/328 |
| 4,554,142 | 11/1985 | Hölderich | 502/202 |
| 4,650,655 | 3/1987 | Chu et al. | 423/329 |
| 5,013,423 | 5/1991 | Chen et al. | 208/64 |

*Primary Examiner*—Anthony McFarlane
*Attorney, Agent, or Firm*—Mark L. Davis; Cathy E. Rincon; W. Keith Turner

[57] ABSTRACT

A method for synthesizing crystalline zeolites requiring a reaction mixture for crystallization thereof which contains Boron Beta Zeolite as an active source of silicon oxide and boron oxide.

15 Claims, No Drawings

PREPARATION OF BOROSILICATE ZEOLITES

BACKGROUND OF THE INVENTION

Natural and synthetic zeolitic materials of the molecular sieve type are known and are staple items of commerce. Crystalline zeolites are extremely well known in the art and have been the subject of much attention in both the patent and technical literature. These materials have been demonstrated to have catalytic properties for various types of hydrocarbon conversions.

Because of their unique molecular sieving characteristics, as well as their potentially acidic nature, zeolites are especially useful in hydrocarbon processing as absorbents, and, as catalysts, for cracking, reforming, isomerizing, and other hydrocarbon conversion reactions. Although many different crystalline aluminosilicates have been prepared and tested, the search continues for new zeolites which can be used in hydrocarbon and chemical processing.

An increasing number of zeolite structures have been made by synthetic methods. Each new structure holds out the possibility of enhanced process selectivity based upon the size of molecules which can move about in the pore system of the catalyst. Aside from the 3-dimensional lattice structure of the crystalline zeolite, elemental composition can be an important factor in the selectivity of catalyst. Catalytic performance may be related to the extent of framework substitution or the type of element which is substituted into the framework.

It is generally known that the structure and composition of zeolites may be varied by the synthetic use of readily available inorganic reagents. There are instances where pre-aged components or even crystalline inorganic materials including other zeolites may be used as reagents to vary the structure and composition of zeolites.

In work reported by Lowe et al. (Proc. 5th Int'l Zeol. Cond.) Naples, p. 85, the formation of "active" silicates was described as highly desirable in A, X and Y synthesis. In U.S. Pat. No. 4,676,958, it is shown that using a crystalline silicate, magadiite, can be beneficial in producing high silica zeolites from a variety of organo-cations or template molecules.

In some zeolite syntheses, one zeolite structure can be found to be a transient phase en route to the formation of the more favorable, but slower crystallizing product. For example, in a synthesis of ZSM-4, Y-type zeolite can be a reaction precursor (see J. Catal. 1979 59 263). A similar result was found for the preparation of zeolite SSZ-13 under high OH⁻ conditions (Zeolites 8 166, 1988). U.S. Pat. No. 4,910,006 discloses that using a known zeolite as a reactant in the synthesis of a novel zeolite provides benefits in terms of the reaction rate for the formation of a novel zeolite and the purity of the novel zeolite.

SUMMARY OF THE INVENTION

The present invention is directed to methods of preparing borosilicate and boroaluminosilicate zeolites which comprise preparing a reaction mixture containing (a) calcined boron beta zeolite or the ammonium form of boron beta zeolite, (b) an alkali metal oxide, (c) an organic template, and (d) water; and said mixture having a composition in terms of mole ratios of oxides falling within the following ranges:

| | |
|---|---|
| $M^+/SiO_2$ | = 0.01–0.50 |
| $OH^-/SiO_2$ | = 0.01–0.60 |
| $H_2O/SiO_2$ | = 10–120 |
| $Q/SiO_2$ | = 0.10–1.00 |
| $SiO_2/Y_2O_3$ | = Greater Than 10 | wherein Q is an organic template, $M^+$ is an alkali metal not supplied by the boron beta zeolite, and $Y_2O_3$ is boron beta zeolite, boron beta zeolite and another zeolite, boron beta zeolite and another source of boron, boron beta zeolite and another source of boron and another source of aluminum, or boron beta zeolite and another source of boron and another source of aluminum and another source of silicon; and maintaining said mixture at crystallization temperature until said crystals are formed.

Among other factors, the present invention is based on our finding that boron beta zeolite in its calcined form or in the ammonium form may be used as a reactant in the synthesis of borosilicate or boroaluminosilicate zeolites. Surprisingly, we have found that under certain reaction conditions, novel zeolites are synthesized using boron beta as a reactant. Some zeolites can only be prepared using this novel synthetic approach. The novel zeolites synthesized by this method have open-pore structures rather than clathrate-type structures. In general, zeolites with open-pore structures are catalytically more useful than zeolites with clathrate-type structures. We have also found that by using this reactant, the rates of reaction are faster than using conventional zeolite preparation methods.

DETAILED DESCRIPTION OF THE INVENTION

Crystalline zeolites can be prepared from an aqueous solution containing calcined boron beta zeolite or the ammonium form of boron beta zeolite, an alkali metal oxide, an organic template, and water. The reaction mixture should have a composition in terms of mole ratios of oxides falling within the following ranges:

| | Narrow | Broad |
|---|---|---|
| $M^+/SiO_2$ | 0.01–0.10 | 0.01–0.50 |
| $OH^-/SiO_2$ | 0.20–0.30 | 0.01–0.60 |
| $H_2O/SiO_2$ | 20–50 | 10–120 |
| $Q/SiO_2$ | 0.2–0.6 | 0.1–1.00 |
| $SiO_2/Y_2O_3$ | 20–200 | Greater Than 10 | wherein Q is an organic template, $M^+$ is an alkali metal not supplied by the boron beta zeolite, and $Y_2O_3$ is boron beta zeolite, boron beta zeolite and another zeolite, boron beta zeolite and another source of boron, boron beta zeolite and another source of boron and another source of aluminum, or boron beta zeolite and another source of boron and another source of aluminum and another source of silicon; and maintaining said mixture at crystallization temperature until said crystals are formed. In addition to quaternary ammonium cations, other types of templates which are soluble and stable under basic pH conditions, such as basic nitrogen compounds, may be used in this reaction mixture.

Particularly preferred crystalline zeolites which can be prepared in accordance with the present invention are those of the open pore zeolites with large and intermediate pores. Small pore systems are not observed. Some products obtained are ZSM-12, ZSM-5 and ZSM- 48, and large pore materials like SSZ-24, SSZ-31 and SSZ-33. U.S. Pat. No. 3,702,886 describes and claims ZSM-5. ZSM-12 is more particularly described in U.S. Pat. No. 3,832,449. SSZ-24 is more particularly described in U.S. Patent No. 4,834,958. SSZ-31 is more particularly described in U.S. Ser. No. 471,158. SSZ-33 is described in U.S. Pat. No. 4,963,337. Each of the above-identified patents and applications are incorporated herein by reference. New zeolite structures may result as well by the present method.

It is to be understood that by incorporating by reference the foregoing patents to describe examples of specific members of the zeolites with greater particularity, it is intended that identification of the therein disclosed crystalline zeolites be resolved on the basis of their respective X-ray diffraction patterns. As discussed above, the present invention contemplates preparation of such catalysts wherein the mole ratio of boron to silica may be different than disclosed in the patents. The incorporation of the identified patents should therefore not be construed as limiting the disclosed crystalline zeolites to those having the specific boria-silica mole ratios discussed therein, it is the crystal structure, as identified by the X-ray diffraction "fingerprint", which established the identity of the specific crystalline zeolite material. In some instances, the lattice constants of the above phases may be seen to be reduced as a result of boron incorporation.

In one embodiment of the invention, boron beta zeolite provides a source of boron and silicon to the reaction mixture. If the boron beta zeolite also contains aluminum, then this zeolite also provides a source of aluminum. In another embodiment of the invention, boron beta zeolite in combination with other borosilicate or boroaluminosilicate zeolites are used as a source of boron, silicon or aluminum in the reaction mixture.

In a further embodiment, boron beta zeolite, and optionally another source of boron, or aluminum or silicon is used in the reaction mixture to synthesize other zeolites. Sources of boron which may be used include boric acid, an alkali borate or a borate ester. Aluminum sources which may be used include dissolved aluminates. A typical silicon source is silicon dioxide.

The use of boron beta as a source of silica in the reaction mixture allows production of high purity crystalline molecular sieves or zeolites. Due to the relatively low hydrothermal stability of boron beta, the crystalline zeolites form relatively rapidly, which allows for crystallite formation of open pore systems compared with reactions using the same templates and the products obtained using normal or prior art zeolite preparations. In these latter cases, clathrasils are often the product. Also in the present invention, the crystals formed generally are smaller due to rapid nucleation. Small crystals, from 100 to 5,000 Angstroms, can be advantageous in catalyst use.

The use of boron beta also allows a relatively smaller concentration of alkali metal hydroxide to be present in the reaction mixture. Because one can use lower amounts of alkali metal hydroxide and because boron beta may be used in the ammonium form as well as the alkali metal form and preferably the sodium form or as mixtures thereof, lower alkali metal containing crystalline zeolites may be obtained.

While not intending to be limited to theory, it is believed that boron beta may contain within its structure the correct building units found in the framework structure of a number of high silica zeolites.

By utilizing the highly porous aspects of the boron beta structure, and in the presence of quaternary organic ammonium cations, the borosilicate can be converted into a new three-dimensional zeolite structure.

A preferred method of preparing synthetic boron beta which is aluminum free is described in our co-pending application U.S. Ser. No. 377,359, incorporated herein by reference. This method comprises preparing a mixture containing an alkaline metal hydroxide, a source of silica dioxide, a source of boron, water and, as a promoter, a lower alkyl di-substituted diquat based upon 2 DABCO (1,4 Diazabicyclo [2.2.2] octane) molecules or 2 Quinuclidine molecules and a short chain spacer, tetraethyl ammonium (TEA) and hydroxide mixtures thereof, and having a composition in terms of mole ratios of oxides falling within the following ranges:

| | Broad | Narrow |
|---|---|---|
| $OH^-/SiO_2$ | 0.25–0.80 | 0.30–0.40 |
| Promotor/$SiO_2$ | 0.05–0.50 | 0.1–0.20 |
| $H_2O/SiO_2$ | At Least 20:1 | 25–50 |
| $SiO_2/B_2O_3$ | 10–100 | 20–50 |
| $TEA/SiO_2$ | 0.00–0.40 | 0.00–0.30 | and maintaining said mixture under crystallization conditions until crystals of said boron beta are formed. If a sufficient amount of the promotor is present in the reaction mixture, the TEA is not needed.

Typical silicon oxide sources in preparing boron beta include silicates, silica hydrogel, silicic acid, colloidal silica, etc. The sodium borates are the preferred alkali metal borates. Temperatures for the process range from about 100° C. to about 175° C. and preferably from about 130° C. to about 160° C., and crystallization times range from about 50 to about 150 hours. Preferably, the hydrothermal crystallization is performed under pressure in an autoclave or static bomb reactor so that the reaction mixture is subject to autogenous pressure. Prior art synthetic methods, without the presence of the lower alkyl substituted DABCO diquat promoters, would be considerably less selective in obtaining a pure crystalline product; ZSM-5 is often a product.

Preferably, the lower alkyl substituted DABCO (1,4 Diazabicyclo [2.2.2] octane) has the formula:

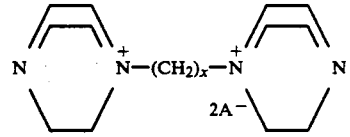

where x equals lower alkyl of 4 to 8 carbon atoms. The nitrogens to which they are attached form an alkylene group containing 4 to 8 carbon atoms. A is an anionic counter ion.

The alkali metal form of boron beta, e.g., Na-boron beta, may be converted to $NH_4$ boron beta by treating the calcined boron beta with an ammonium salt such as aqueous ammonium nitrate or acetate.

Various types of templates which are soluble and stable under basic pH conditions may be used in the method of our invention. Preferably, quaternary ammonium cations and basic nitrogen compounds are used.

The organic component of the crystallization mixtures where boron beta is a reactant acts as a template during crystallization and from which Q is derived is an organic quaternary ammonium compound and includes those having the following formulas:

wherein $R_1-R_4$ is alkyl of from 1 to 20 carbon atoms, heteroalkyl of from 1 to 20 carbon atoms, aryl of from 6 to 8 carbon atoms, heteroaryl of from 5 to 8 carbon atoms, cycloalkyl of from 3 to 8 carbon atoms, cycloheteroalkyl of from 3 to 8 carbon atoms or combinations thereof and polycyclic molecules as well; X is an anion, e.g., fluoride, chloride, bromide, iodide, hydroxide, acetate, sulfate, carboxylate, etc. The anion is one which is not detrimental to formation of the zeolite.

Non-limiting examples of these types of compounds include salts of tetramethylammonium, tetraethylammonium, tetrapropylammonium, tetrabutylammonium, dibenzyldiethylammonium, benzyltrimethylammonium, trimethylcyclopentylammonium, trimethylfurfurylammonium, dimethylethylcyclopentylammonium, ethyltrimethylammonium and chlorine, bromine, or iodine, or

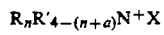

wherein R' is a hydrocarbon group containing 3 to 10 carbon atoms which is attached to the $N^+$ and forms an alicyclic, heteroalicyclic or heteroaromatic structure, a represents more than 1 bond to $N^+$ from R', and X is as defined above. Such structures may be, as non-limiting examples:

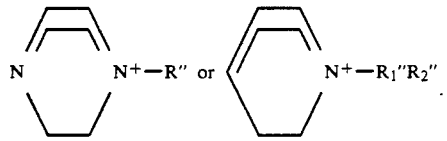

wherein R", $R_1$", and $R_2$" are alkyl of from 1 to 20 carbon atoms, heteroalkyl of from 1 to 20 carbon atoms, aryl, heteroaryl, cycloalkyl of from 3 to 8 carbon atoms or cycloheteroalkyl of from 3 to 8 carbon atoms; or compounds containing multiple cationic centers which include those having the formula:

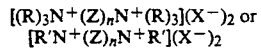

wherein R, R', and X are as above defined, Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n is a number of from 1 to about 50. Nonlimiting examples of such multiple cationic center containing compounds include:

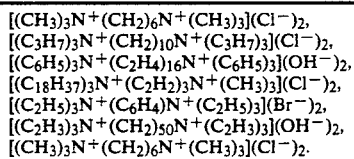

The reaction mixture is prepared using standard zeolitic preparation techniques.

The reaction mixture is maintained at an elevated temperature until the crystals of the zeolite are formed. The temperatures during the hydrothermal crystallization step are typically maintained from about 100° C. to about 250° C., preferably from about 120° C. to about 200° C., and most preferably from about 130° C. to about 165° C. The crystallization period is typically from about 1 to about 7 days.

The hydrothermal crystallization is conducted under pressure and usually in an autoclave so that the reaction mixture is subject to autogenous pressure. The reaction mixture can be stirred during crystallization.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as synthesized, zeolite crystals The drying step can be performed at atmospheric or subatmospheric pressures.

As in the case of the crystalline zeolites referenced previously, the organic quaternary amine cation moiety is quite readily thermally decomposed and removed from the zeolite by calcination in an oxidizing atmosphere (air) or inert atmosphere at temperatures of from about 480° F. to 1500° F.

The crystalline zeolites obtained by the method of this invention are suitable for use in all the absorption and catalyst applications in which the above-referenced zeolites can be employed.

The synthetic molecular sieve or zeolite in some cases can be used as synthesized or it may have to be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solution, to increase the silica:boria mole ratio. The zeolite can also be steamed; steaming helps stabilize the crystalline lattice to attack from acids. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Zn, Cd, Pt, Pd, Ni, Co, Ti, Al, Sn and Fe are particularly preferred.

The hydrogen, ammonium and metal components can be exchanged into the zeolite. The zeolite can also be impregnated with the metals or the metals can be physically intimately admixed with the zeolite using standard methods known to the art. And the metals can be occluded in the crystal lattice by having the desired metals present as ions in the reaction mixture from which the zeolite is prepared.

Typical ion exchange techniques involve contacting the synthetic zeolite with a solution containing a salt of the desired replacing cation or cations. Although a wide variety of salts can be employed, chlorides and other halides, nitrates and sulfates are particularly preferred. Representative ion exchange techniques are disclosed in a wide variety of patents including U.S. Pat. Nos. 3,140,249; 3,140,251; and 3,140,253. Ion exchange can take place either before or after the zeolite is calcined.

Following contact with the salt solution of the desired replacing cation, the zeolite is typically washed with water and dried at temperatures ranging from 65° C. to about 315° C. After washing, the zeolite can be calcined in air or inert gas at temperatures ranging from about 480° F. to 1500° F. for periods of time ranging from 1 to 48 hours, or more, to produce a catalytically active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any, effect on the zeolite lattice structures.

The borosilicate can be formed into a wide variety of physical shapes. Generally speaking, the zeolite can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the borosilicate can be extruded before drying, or dried or partially dried and then extruded.

A portion of the boron in the borosilicate crystalline network may be replaced by other Group IIIA metals. For example, aluminum insertion may occur by thermal treatment of the zeolite in combination with an aluminum binder or dissolved aluminum source. By replacing the boron with aluminum as described, it is possible to obtain a zeolite composition by this method with a lower silica to alumina ratio than the silica to alumina ratio of a zeolite which is synthesized by methods shown in the prior art.

The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may be naturally occurring or may be in the form of gelatinous precipitates, sols or gels, including mixtures of silica and metal oxides. Use of an active material in conjunction with the synthetic zeolite, combined with it, can improve the conversion and selectivity of the catalyst in certain organic conversion processes. Inactive materials can serve as diluents to control the amount of conversion in a given process so that products can be obtained economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength and attrition resistance because in petroleum refining the catalyst is often subject to rough handling. This tends to break the catalyst down into powders which cause problems in processing.

Naturally occurring clays which can be composited with the synthetic zeolites of this invention include the montmorillonite and kaolin families, which families include the subbentonites and the kaolins commonly known as Dixie, McNamee, Georgia, and Florida clays or others in which the main mineral constituent is halloysite, kaolinite, dickite, nacrite or anauxite. Fibrous clays such as sepiolite and attapulgite can also be used as supports. Such clays can be used in the raw state as originally mined or can be calcined, treated with acid, or chemically modified.

In addition to the foregoing materials, the zeolite can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia. The matrix can be in the form of a cogel.

The zeolite can also be composited with other zeolites such as synthetic and natural faujasites (e.g., X and Y), erionites and mordenites. They can also be composited with purely synthetic zeolites. The combination of zeolites can also be composited in a porous inorganic matrix.

EXAMPLES

Example 1

Preparation of a Boron Beta Zeolite

A solution is formed from mixing 28.5 g of 1,4 bis(1-Azonium[2.2.2.]bicyclo[2.2.2.]octane) butane diiodide, 660 g of Ludox AS-30 solution (30 wt. % $SiO_2$), 22.6 g of sodium borate 10 hydrate, 364 g of 40% tetraethylammonium hydroxide, and 616 g of $H_2O$. The contents are loaded into a Hastelloy-lined stainless steel reactor designed to operate under pressure. The reactor is heated at 150° C. for 6 days at 50 rpm. Upon cooling the reactor, the contents are poured into a filter and the precipitated solids are washed several times with water and then air-dried. The product has the X-ray diffraction pattern shown in Table I.

The X-ray powder diffraction patterns for the Boron Beta of Example 1 and the prepared zeolites were determined using standard techniques. The radiation was K-alpha/doublet of copper and a scintillation counter spectrometer with a strip-chart pen recorder was used. The peak heights I and the positions as a function of $2\theta$, where $\theta$ is the Bragg angle, were read from the spectrometer chart. From these measured values, the relative intensities, 100 $I/I_o$, where $I_o$ is the intensity of the strongest line or peak, and d, the interplanar spacing in Angstroms corresponding to the recorded lines, can be calculated. The X-ray diffraction pattern obtained for the product corresponded with the known pattern for each of the indicated zeolites.

TABLE I

| Boron Beta Zeolite X-ray Diffraction Pattern | | |
|---|---|---|
| $2\theta$ | d/n | Int. |
| 7.7 | 11.5 | 28 B |
| 18.55 | 4.78 | 8 VB |
| 21.55 | 4.12 | 22 |
| 22.60 | 3.93 | 110 |
| 25.60 | 3.48 | 4 |
| 26.00 | 3.43 | 3 B |
| 27.58 | 3.24 | 8 |
| 29.00 | 3.08 | 6 B |
| 29.98 | 2.98 | 6 |
| 30.65 | 2.92 | 2 |
| 31.15 | 2.87 | 1 VB |
| 33.67 | 2.66 | 4 B |
| 35.27 | 2.55 | 2 |
| 36.50 | 2.47 | 2 B |

B = Broad
VB = Very Broad

EXAMPLE 2

Using 0.9 g of calcined (1100° F., $N_2$, 4 hours) boron beta prepared according to Example 1, and adding in 7.5 mL $H_2O$ and 1.50 g 1M NaOH, the solid borosilicate was slurried in the Teflon liner of a Parr 4749 pressure reactor. Three grams of 0.75 molar N,N,N-trimethyl-2-adamantammonium hydroxide (identified as Template T20 in Table II) were added and the reactor was sealed and heated for 72 hours at 150° C. without agitation. Upon cooling, the product is recovered by filtration and dried after several washings. A zeolite was produced which is SSZ-24 by X-ray diffraction. The zeolite contains $B_2O_3$ as evidenced by lattice constant reductions.

Examples 3–30

Using the general procedure outlined in Example 2, various zeolites are prepared as shown in Tables III through VIII. In some instances, the necessary reaction time may be more than 1–3 days.

The templates used in Examples 1–90 are specifically described in Table II.

TABLE II

Template Molecules Used in β Beta Conversion

| Entry No. | Structure |
|---|---|
| A22 | 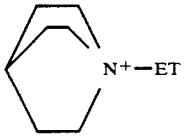 |
| B19 | 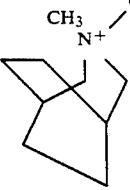 |
| A31 | 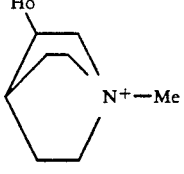 |
| B25 | 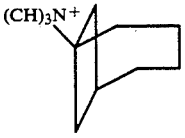 |
| B14 | 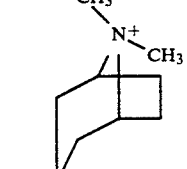 |
| B08 | 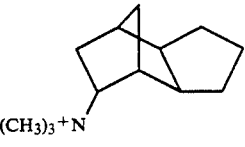 |
| T20 | 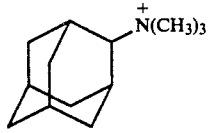 |
| T06 | 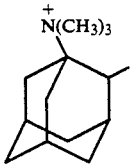 |
| B17 | 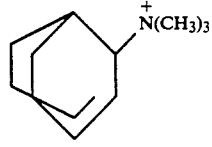 |
| T35 | 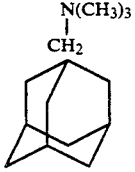 |
| T51 | 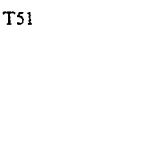 |
| B34 | 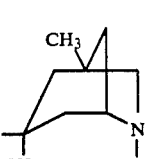 |
| B-57 | 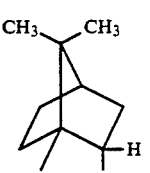 |
| C02 | 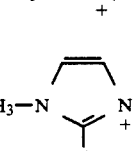 |

TABLE II-continued

Template Molecules Used in β Beta Conversion

| Entry No. | Structure |
|---|---|
| C23 | 1-isopropyl-3-methyl-2-methylimidazolinium cation (CH$_3$ groups on N, CH$_3$ at C2) |
| C28 | 1,3-dimethyl-2-isopropylimidazolinium cation |
| F43 | (CH$_3$)$_3$N$^+$—[bicyclic]—N$^+$(CH$_3$)$_3$ (octahydropentalene-2,5-diyl) |
| F41 | (CH$_3$)$_3$N$^+$—[dimethyl bicyclic]—N$^+$(CH$_3$)$_3$ with two CH$_3$ groups on ring junctions |
| F28 | (CH$_3$)$_3$N$^+$—(CH$_2$)$_X$—N$^+$(CH$_3$)$_3$    X = 4 |
| F30 | X = 6 |
| F35 | X = 7 |
| F63 | (CH$_3$)$_3$N$^+$—(CH$_2$)$_3$—N$^+$(CH$_3$)$_2$—(CH$_2$)$_3$—N$^+$(CH$_3$)$_3$ |
| F68 | (CH$_3$)$_3$N$^+$—(CH$_2$)$_2$—CH(CH$_2$CH$_3$)—N$^+$(CH$_3$)$_3$ |
| F67 | (CH$_3$)$_3$N$^+$—CH$_2$—C(CH$_3$)$_2$—CH$_2$—N$^+$(CH$_3$)$_3$ |
| O30 | (iso-alkyl chain)$_3$N$^+$CH$_3$ |
| O06 | (CH$_3$)$_3$C—C(CH$_3$)$_2$—N$^+$(CH$_3$)$_3$ (neopentyl-type) |
| O33 | C$_6$H$_5$—CH$_2$N$^+$(CH$_3$)$_3$ |
| F22 | (CH$_3$)$_3$N$^+$—CH$_2$—CH(CH$_3$)—(CH$_2$)$_3$—N$^+$(CH$_3$)$_3$ |
| G25 | 3,3-dimethyl-1,1-dimethylpiperidinium cation |
| G29 | spiro[5.5] dimethyl ammonium cation |
| F46 | tricyclic with two CH$_2$N$^+$(CH$_3$)$_3$ groups |
| B09 | bicyclic with N$^+$(CH$_3$)$_2$ in ring and alkene |
| C51 | 1-cyclohexyl-3-methyl-2-cyclohexylimidazolinium cation |
| C11 | 1,3-diisopropylimidazolinium cation |
| C12 | 1-methyl-3-isopropylimidazolinium cation |
| F40 | tricyclic diamine with two N$^+$(CH$_3$)$_3$ groups |
| L26 | 3,3,5,5-tetramethylcyclohexyl-N$^+$(CH$_3$)$_3$ |
| L17 | 2-cyclohexylcyclohexyl-N$^+$(CH$_3$)$_3$ |
| L01 | cyclohexyl-N$^+$(CH$_3$)$_3$ |

TABLE II-continued

Template Molecules Used in β Beta Conversion

| Entry No. | Structure |
|---|---|
| L19 | 4-methylcyclohexyl-N+(CH3)3 |
| E12 | N-methyl pyrrolidinium with CH3, CH3 |
| G16 | 2,2,6,6-tetramethyl-4-(trimethylammonio)piperidine (HN, N+(CH3)3) |
| M40 | N-butyl-N-methyl cycloheptylammonium (Bu, CH3) |
| G28 | bis(1,1-dimethylpiperidinium) propane, CH3/N+/CH3—(CH2)3—N+/CH3/CH3 |
| M39 | 3-methyl cycloheptyl N+(CH3)2 |
| G23 | bis(2-methylpropyl) ether with N+(CH3)2 |
| G24 | 3,5-dimethyl piperidinium with N+(CH3)2 |
| G32 | 2,6-dimethyl cyclohexyl N+(CH3)3 |

TABLE III

CONVERSION OF BORON BETA TO OTHER ORGANOZEOLITES, POLYCYCLIC TEMPLATE MOLECULES

| Ex. No. | Organo Cation | Alkali Cation | SiO2/B2O3 | SiO2/Al2O3 | XRD |
|---|---|---|---|---|---|
| 3 | A22 | Na | 130 | ∞ | ZSM-5 |
| 4 | B19 | Na | 130 | ∞ | SSZ-31 |
| 5 | B19 | Na | 100 | 500 | SSZ-31 |
| 6 | A31 | Na | 130 | ∞ | ZSM-5 |
| 7 | B25 | Na | 130 | ∞ | SSZ-31 |
| 8 | B25 | Na | 100 | 500 | Beta Zeolite |
| 9 | B14 | Na | 130 | ∞ | Amorphous |
| 10 | B14 | Na | 100 | 500 | Beta Zeolite |
| 11 | B08 | Na | 50 | ∞ | Beta Zeolite |
| 12 | B08 | K | 130 | ∞ | Beta Zeolite + SSZ-31 |
| 13 | B08 | Rb | 130 | ∞ | Beta Zeolite + SSZ-31 |
| 14 | B08 | Cs | 130 | ∞ | Beta Zeolite + SSZ-31 |
| 15 | T20 | Na | 130 | ∞ | (B)SSZ-24 |
| 16 | T20 | K | 130 | ∞ | (B)SSZ-24 |
| 17 | T20 | Rb | 130 | ∞ | (B)SSZ-24 |
| 18 | T20 | Cs | 130 | ∞ | Amorph + Beta Zeolite |
| 19 | T20 | Na | 50 | ∞ | (B)SSZ-24 |
| 20 | T20 | Na | 30 | ∞ | (B)SSZ-24 |
| 21 | T20 | Na | 100 | 500 | (B)SSZ-24 |
| 22 | T06 | Na | 130 | ∞ | (B)SSZ-24 |
| 23 | T06 | Na | 50 | ∞ | Beta Zeolite |
| 24 | B17 | Na | 30 | ∞ | (B)SSZ-24 |
| 25 | B34 | Na | 130 | ∞ | SSZ-31 |
| 26 | B34 | Na | 30 | ∞ | Beta Zeolite |
| 27 | B09 | Na | 130 | ∞ | ZSM-12 + Beta Zeolite |
| 28 | B09 | Na | 50 | ∞ | Beta Zeolite |
| 29 | F40 | Na | 130 | ∞ | Beta Zeolite |
| 30 | F40 | Na | 70 | ∞ | Beta Zeolite |
| 31 | F40 | Na | 30 | ∞ | SSZ-33 |
| 32 | F41 | Na | 30 | ∞ | SSZ-33 |
| 33 | F41 | Na | 70 | ∞ | Amorph + Beta Zeolite |
| 34 | F41 | Na | 130 | ∞ | Amorph + Minor Beta Zeolite |
| 35 | T35 | Na | 100 | ∞ | (B)SSZ-24 |
| 36 | T35 | Na | 30 | ∞ | Beta Zeolite |
| 37 | T51 | Na | 70 | ∞ | SSZ-31 |
| 38 | T51 | Na | 30 | ∞ | Beta Zeolite |
| 39 | F46 | Na | 100 | ∞ | Amorphous |
| 40 | B57 | Na | 30 | ∞ | SSZ-25 |

TABLE IV

MONOCYCLIC TEMPLATES

| Ex. No. | Organo Cation | Alkali Cation | SiO2/B2O3 | SiO2/Al2O3 | XRD |
|---|---|---|---|---|---|
| 41 | L26 | Na | 130 | ∞ | Beta Zeolite |
| 42 | L26 | Na | 50 | ∞ | Beta Zeolite |
| 43 | L26 | Na | 100 | 500 | Beta Zeolite |
| 44 | L17 | Na | 130 | ∞ | ZSM-48 |
| 45 | L17 | Na | 100 | 500 | Cristobalite + ZSM-48 |
| 46 | L01 | Na | 130 | ∞ | Beta Zeolite + Minor ZSM-12 |
| 47 | L19 | Na | 130 | ∞ | ZSM-12 + Beta Zeolite |

TABLE V

PIPERIDINES AND RELATED NITROGEN HETROCYCLES

| Ex. No. | Organo Cation | Alkali Cation | SiO2/B2O3 | SiO2/Al2O3 | XRD |
|---|---|---|---|---|---|
| 48 | E12 | Na | 130 | ∞ | ZSM-12 + Minor ZSM-48 |
| 49 | G16 | Na | 130 | ∞ | SSZ-31 |
| 50 | G16 | Na | 50 | ∞ | Beta Zeolite + Trace SSZ-31 |
| 51 | M40 | Na | 130 | ∞ | ZSM-12 + Cristobalite |
| 52 | G28 | Na | 130 | ∞ | Beta Zeolite + Trace ZSM-12 |
| 53 | G28 | Na | 100 | 500 | Beta Zeolite |
| 54 | M39 | Na | 130 | ∞ | SSZ-31 |
| 55 | M39 | Na | 30 | ∞ | Beta Zeolite |

TABLE V-continued

PIPERIDINES AND RELATED NITROGEN HETEROCYCLES

| Ex. No. | Organo Cation | Alkali Cation | SiO$_2$/B$_2$O$_3$ | SiO$_2$/Al$_2$O$_3$ | XRD |
|---|---|---|---|---|---|
| 56 | G23 | Na | 130 | ∞ | ZSM-5,12,Cristobalite |
| 57 | G23 | Na | 30 | ∞ | ZSM-12,5,Cristobalite |
| 58 | G24 | Na | 130 | ∞ | ZSM-12 |
| 59 | G24 | Na | 50 | ∞ | ZSM-12 |
| 60 | G25 | Na | 130 | ∞ | Nonasil |
| 61 | G25 | Na | 30 | ∞ | Beta Zeolite |
| 62 | G29 | Na | 130 | ∞ | Beta Zeolite + ZSM-12 |
| 63 | G32 | Na | 30 | ∞ | Beta Zeolite |
| 64 | G32 | Na | 70 | ∞ | Beta Zeolite + Amorph |
| 65 | G32 | Na | 130 | ∞ | Amorph + Beta Zeolite |

TABLE VI

IMIDAZOLES

| Ex. No. | Organo Cation | Alkali Cation | SiO$_2$/B$_2$O$_3$ | SiO$_2$/Al$_2$O$_3$ | XRD |
|---|---|---|---|---|---|
| 66 | C51 | Na+ | 100 | ∞ | Beta Zeolite |
| 67 | C23 | Na | 130 | ∞ | ZSM-12 |
| 68 | C28 | Na | 100 | 500 | Beta Zeolite + ZSM-12 |
| 69 | C28 | Na | 130 | ∞ | ZSM-12 |
| 70 | C02 | Na | 130 | ∞ | ZSM-12 |
| 71 | C02 | Na | 100 | 500 | ZSM-12 |
| 72 | C11 | Na | 50 | ∞ | Beta Zeolite |
| 73 | C11 | Na | 130 | ∞ | ZSM-12 + ZSM-23 |

TABLE VII

LINEAR SYMMETRIES $(CH_3)_3 N^+ - (CH_2)_X - N^+(CH_3)_3$

| Ex No. | Organo Cation | Alkali Cation | SiO$_2$/B$_2$O$_3$ | SiO$_2$/Al$_2$O$_3$ | XRD |
|---|---|---|---|---|---|
| 74 | F28, X = 4 | Na | 100 | ∞ | ZSM-12 |
| 75 | F30, X = 6 | Na | 130 | ∞ | Beta Zeolite + ZSM-12 |
| 76 | F35, X = 7 | Na | 130 | ∞ | ZSM-48 |
| 77 | F43 | Na | 130 | ∞ | Beta Zeolite + ZSM-12 + ZSM-5 |
| 78 | F43 | Na | 100 | 500 | Beta Zeolite |
| 79 | F63, Me$_3$N$^+$(CH$_2$)$_3$N$^+$(Me)$_2$(CH$_2$)$_3$N$^+$Me$_3$ | Na | 130 | ∞ | ZSM-48 |
| 80 | F63, Me$_3$N$^+$(CH$_2$)$_3$N$^+$(Me)$_2$(CH$_2$)$_3$N$^+$Me$_3$ | K | 130 | ∞ | Minor Beta Zeolite |
| 81 | F63, Me$_3$N$^+$(CH$_2$)$_3$N$^+$(Me)$_2$(CH$_2$)$_3$N$^+$Me$_3$ | Na | ∞ | 25 | Beta Zeolite |
| 82 | F63, Me$_3$N$^+$(CH$_2$)$_3$N$^+$(Me)$_2$(CH$_2$)$_3$N$^+$Me$_3$ | Na | 100 | 500 | ZSM-48 |
| 83 | F68, Me$_3$N$^+$ - (CH$_2$)$_2$CH(Et) - N$^+$Me$_3$ | Na | 130 | ∞ | ZSM-48 |
| 84 | F67, Me$_3$N$^+$ CH$_2$ C(CH$_3$)$_2$ - CH$_2$ N$^+$ Me$_3$ | Na | 130 | ∞ | Amorph + Beta Zeolite |

TABLE VIII

MISCELLANEOUS QUATERNARY AMMONIUM COMPOUNDS

| Ex. No. | Organo Cation | Alkali Cation | SiO$_2$/B$_2$O$_3$ | SiO$_2$/Al$_2$O$_3$ | XRD |
|---|---|---|---|---|---|
| 85 | O30 | Na | 130 | ∞ | Beta Zeolite |
| 86 | O30 | Na | 100 | 500 | Beta Zeolite |
| 87 | O06 | Na | 130 | ∞ | ZSM-5 |
| 88 | O06 | Na | 100 | 500 | ZSM-5 |
| 89 | O33 | Na | 130 | ∞ | ZSM-12 |
| 90 | O33 | Na | 100 | 500 | Beta Zeolite + Minor ZSM-12 |

Example 91

An experiment similar to Example 23 is set up. The charged, quaternary ammonium compound, T06, is replaced with 1 g of the parent amine, 1-Adamantamine (Aldrich). The reaction is run for 8 days at 43 rpm and 150° C. The crystalline product, upon work-up, is SSZ-29 (related to SGT structure, Meier and Olsen, 1987). This example, while demonstrating that the free amine works, also shows that a clathrate structure is formed rather than the open-pore product SSZ-24, which can be produced by the quaternary ammonium template, T06.

What is claimed is:

1. A method of preparing crystalline zeolites which comprises preparing a reaction mixture comprising calcined boron beta zeolite or the ammonium form of boron beta zeolite, an alkali metal oxide, an organic template and water; and said mixture having a composition in terms of mole ratios of oxides falling within the following ranges:

$M^+/SiO_2$ = 0.01–0.50
$OH^-/SiO_2$ = 0.01–0.60
$H_2O/SiO_2$ = 10–120
$Q/SiO_2$ = 0.10–1.00
$SiO_2/Y_2O_3$ = Greater Than 10 wherein Q is an organic template, M+ is an alkali metal not supplied by the boron beta zeolite, and Y$_2$O$_3$ is boron beta zeolite in its calcined or ammonium form; and maintaining said mixture at crystallization temperature until said crystals are formed.

2. A method of preparing crystalline zeolites which comprises preparing a reaction mixture comprising calcined boron beta zeolite or the ammonium form of boron beta zeolite, another zeolite, an alkali metal oxide, an organic template and water; and said mixture having a composition in terms of mole ratios of oxi falling within the following ranges:

$M^+/SiO_2$ = 0.01–0.50
$OH^-/SiO_2$ = 0.01–0.60
$H_2O/SiO_2$ = 10–120
$Q/SiO_2$ = 0.10–1.00
$SiO_2/Y_2O_3$ = Greater Than 10 wherein Q is an organic template, M+ is an alkali metal not supplied by the boron beta zeolite, and Y$_2$O$_3$ is boron beta zeolite and another zeolite; and maintaining said mixture at crystallization temperature until said crystals are formed.

3. A method of preparing crystalline zeolites which comprises preparing a reaction mixture comprising calcined boron beta zeolite or the ammonium form of boron beta zeolite, another source of boron, an alkali metal oxide, an organic template and water; and said mixture having a composition in terms of mole ratios of oxides falling within the following ranges:

| |
|---|
| $M^+/SiO_2$ = 0.01–0.50 |
| $OH^-/SiO_2$ = 0.01–0.60 |
| $H_2O/SiO_2$ = 10–120 |
| $Q/SiO_2$ = 0.10–1.00 |
| $SiO_2/Y_2O_3$ = Greater Than 10 | wherein Q is an organic template, $M^+$ is an alkali metal not supplied by the boron beta zeolite, and $Y_2O_3$ is a mixture of boron beta zeolite and another source of boron; and maintaining said mixture at crystallization temperature until said crystals are formed.

4. A method of preparing crystalline zeolites which comprises preparing a reaction mixture comprising calcined boron beta zeolite or the ammonium form of boron beta zeolite, another source of boron, another source of aluminum, an alkali metal oxide, an organic template and water; and said mixture having a composition in terms of mole ratios of oxides falling within the following ranges:

| |
|---|
| $M^+/SiO_2$ = 0.01–0.50 |
| $OH^-/SiO_2$ = 0.01–0.60 |
| $H_2O/SiO_2$ = 10–120 |
| $Q/SiO_2$ = 0.10–1.00 |
| $SiO_2/Y_2O_3$ = Greater Than 10 | wherein Q is an organic template, $M^+$ is an alkali metal not supplied by the boron beta zeolite, and $Y_2O_3$ is a mixture of boron beta zeolite, another source of boron, and another source of aluminum; and maintaining said mixture at crystallization temperature until said crystals are formed.

5. A method of preparing crystalline zeolites which comprises preparing a reaction mixture comprising calcined boron beta zeolite or the ammonium form of boron beta zeolite, another source of boron, another source of aluminum, another source of silicon, an alkali metal oxide, an organic template and water; and said mixture having a composition in terms of mole ratios of oxides falling within the following ranges:

| |
|---|
| $M^+/SiO_2$ = 0.01–0.50 |
| $OH^-/SiO_2$ = 0.01–0.60 |
| $H_2O/SiO_2$ = 10–120 |
| $Q/SiO_2$ = 0.10–1.00 |
| $SiO_2/Y_2O_3$ = Greater Than 10 | wherein Q is an organic template, $M^+$ is an alkali metal not supplied by the boron beta zeolite, and $Y_2O_3$ is a mixture of boron beta zeolite, another source of boron, another source of aluminum, and another source of silicon; and maintaining said mixture at crystallization temperature until said crystals are formed.

6. The method of claim 1, 2, 3, 4 or 5 wherein the crystalline zeolite formed is calcined at a temperature of from 480° F. to 1500° F.

7. The method of claim 1, 2, 3, 4 or 5 wherein $M^+$ is sodium.

8. The method of claim 1, 2, 3, 4 or 5 wherein the organic template is a basic nitrogen compound.

9. The method of claim 1, 2, 3, 4 or 5 wherein the organic template is a quaternary organic ammonium cation.

10. The method of claim 9 wherein the quaternary organic ammonium cation is derived from compounds having the formula:

$$R_1R_2R_3R_4N^+X^-$$

wherein $R_1$–$R_4$ is alkyl of from 1 to 20 carbon atoms, heteroalkyl of from 1 to 20 carbon atoms, aryl of from 6 to 8 carbon atoms, heteroaryl of from 5 to 8 carbon atoms, cycloalkyl of from 3 to 8 carbon atoms, cycloheteroalkyl of from 3 to 8 carbon atoms or combinations thereof; and X is an anion.

11. The method of claim 9 wherein the quaternary organic ammonium cation is derived from compounds having the formula:

$$[(R)_3N^+(Z)_nN^+(R)_3](X^-)_2 \text{ or}$$
$$[R'N^{30}(Z)_nN^+R'](X^-)_2$$

wherein R is alkyl of from 1 to 20 carbon atoms, heteroalkyl of from 1 to 20 carbon atoms, aryl of from 6 to 8 carbon atoms, heteroaryl of from 5 to 8 carbon atoms, cycloalkyl of from 3 to 8 carbon atoms, cycloheteroalkyl of from 3 to 8 carbon atoms; R' is a hydrocarbon group containing 3 to 10 carbon atoms which is attached to the $N^+$ and forms an alicyclic, heterocyclic or heteroaromatic structure; X is an anion; Z is a bridging member selected from the group consisting of alkyl of from 1 to 20 carbon atoms, alkenyl of from 2 to 20 carbon atoms, aryl, heteroalkyl of from 1 to 20 carbon atoms, aryl, heteroalkyl of from 2 to 20 carbon atoms and heteroaryl, and n is a number of from 1 to about 50.

12. The method of claim 2 wherein the other zeolite in the reaction mixture is borosilicate or boroaluminosilicate zeolite.

13. The method of claim 3, 4 or 5 wherein the other source of boron is boric acid, an alkali borate, or a borate ester.

14. The method of claim 4 or 5 wherein the aluminum source is a dissolved aluminate.

15. The method of claim 5 wherein the source of silicon is silicon dioxide.

* * * * *

UNITED STATES PATENT AND TRADEMARK OFFICE
CERTIFICATE OF CORRECTION

PATENT NO. : 5,187,132
DATED : February 16, 1993
INVENTOR(S) : Stacey I. Zones et al.

It is certified that error appears in the above-identified patent and that said Letters Patent is hereby corrected as shown below:

Claim 2, Col. 16, line 52:  "oxi" should read --oxides--

Claim 11, Col. 18, line 31:  "$[R'N^{30}(Z)$" should read --$[R'N^{+}(Z)$--

Signed and Sealed this

Sixteenth Day of August, 1994

*Attest:*

BRUCE LEHMAN

*Attesting Officer*   Commissioner of Patents and Trademarks